United States Patent
Sidhu et al.

(10) Patent No.: US 9,049,260 B2
(45) Date of Patent: Jun. 2, 2015

(54) INTEGRATING SOCIAL-NETWORKING INFORMATION

(71) Applicants: Kiranjit Singh Sidhu, East Palo Alto, CA (US); Florin Ratiu, Mountain View, CA (US); Alexander Paul Schultz, San Francisco, CA (US); David Y. Chen, Mountain View, CA (US)

(72) Inventors: Kiranjit Singh Sidhu, East Palo Alto, CA (US); Florin Ratiu, Mountain View, CA (US); Alexander Paul Schultz, San Francisco, CA (US); David Y. Chen, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 81 days.

(21) Appl. No.: 13/750,907

(22) Filed: Jan. 25, 2013

(65) Prior Publication Data
US 2014/0214931 A1    Jul. 31, 2014

(51) Int. Cl.
*G06F 15/16* (2006.01)
*H04L 29/06* (2006.01)

(52) U.S. Cl.
CPC ................................. *H04L 65/403* (2013.01)

(58) Field of Classification Search
CPC ............ H04L 63/102; H04L 29/08693; H04L 63/107; H04L 67/22
USPC ................................. 709/202, 204, 218, 219
See application file for complete search history.

(56) References Cited

U.S. PATENT DOCUMENTS

| | | | |
|---|---|---|---|
| 8,589,805 B2 * | 11/2013 | Knight | 715/752 |
| 2012/0209783 A1 * | 8/2012 | Smith et al. | 705/308 |
| 2012/0259773 A1 * | 10/2012 | Hoffman | 705/40 |
| 2012/0278733 A1 * | 11/2012 | Knight | 715/752 |
| 2014/0095603 A1 * | 4/2014 | Bhardwaj et al. | 709/204 |

* cited by examiner

*Primary Examiner* — Liangche A Wang
(74) *Attorney, Agent, or Firm* — Baker Botts L.L.P.

(57) ABSTRACT

In one embodiment, a method includes receiving a message associated with a user at an information exchange system. At least one correspondent associated with the user may be determined, based on the message. A social connection between the user and the at least one correspondent may be assessed with respect to a social-networking system. The information exchange system may provide an interface for display to the user, the interface comprising information associated with the message. If the social connection is confirmed, the interface may include social-networking information associated with the at least one correspondent. Otherwise, the interface may provide functionality to create a social connection between the user and the at least one correspondent with respect to the social-networking system.

27 Claims, 5 Drawing Sheets

INTEGRATING SOCIAL-NETWORKING INFORMATION

TECHNICAL FIELD

This disclosure generally relates to providing social-networking integration for an information exchange system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments provide social-networking integration for an information exchange system. Particular embodiments enable integration between the information exchange system and a social-networking system to provide users of the information exchange system with access to their social graph and associated social-networking information through an interface provided by the information exchange system. Users of the information exchange system may be able to discover whether correspondents with whom they interact in the information exchange system have a presence in the social-networking system and add those correspondents as social-networking connections. The information exchange system may be any type of system including a network of users who may correspond with or otherwise interact with each other, such as, by way of example and not limitation, an electronic mail system, a different social-networking system, a professional-networking system, a bulletin board system, a chat or message exchange system, an online gaming network, a sales organization management system, a corporate intranet or extranet, a customer relationship management system, an electronic commerce system, etc.

DESCRIPTION OF EXAMPLE EMBODIMENTS

Particular embodiments provide social-networking integration for an information exchange system. Particular embodiments enable integration between the information exchange system and a social-networking system to provide users of the information exchange system with access to their social graph and associated social-networking information through an interface provided by the information exchange system. Users of the information exchange system may be able to discover whether correspondents with whom they interact in the information exchange system have a presence in the social-networking system and add those correspondents as social-networking connections. The information exchange system may be any type of system that includes a network of users who may correspond with or otherwise interact with each other, such as, by way of example and not limitation, an electronic mail system, a different social-networking system, a professional-networking system, a bulletin board system, a chat or message exchange system, an online gaming network, a news or other content media system, a recommendations system, a sales organization management system, a corporate intranet or extranet, a customer relationship management system, an electronic commerce system, etc.

Figure 1:
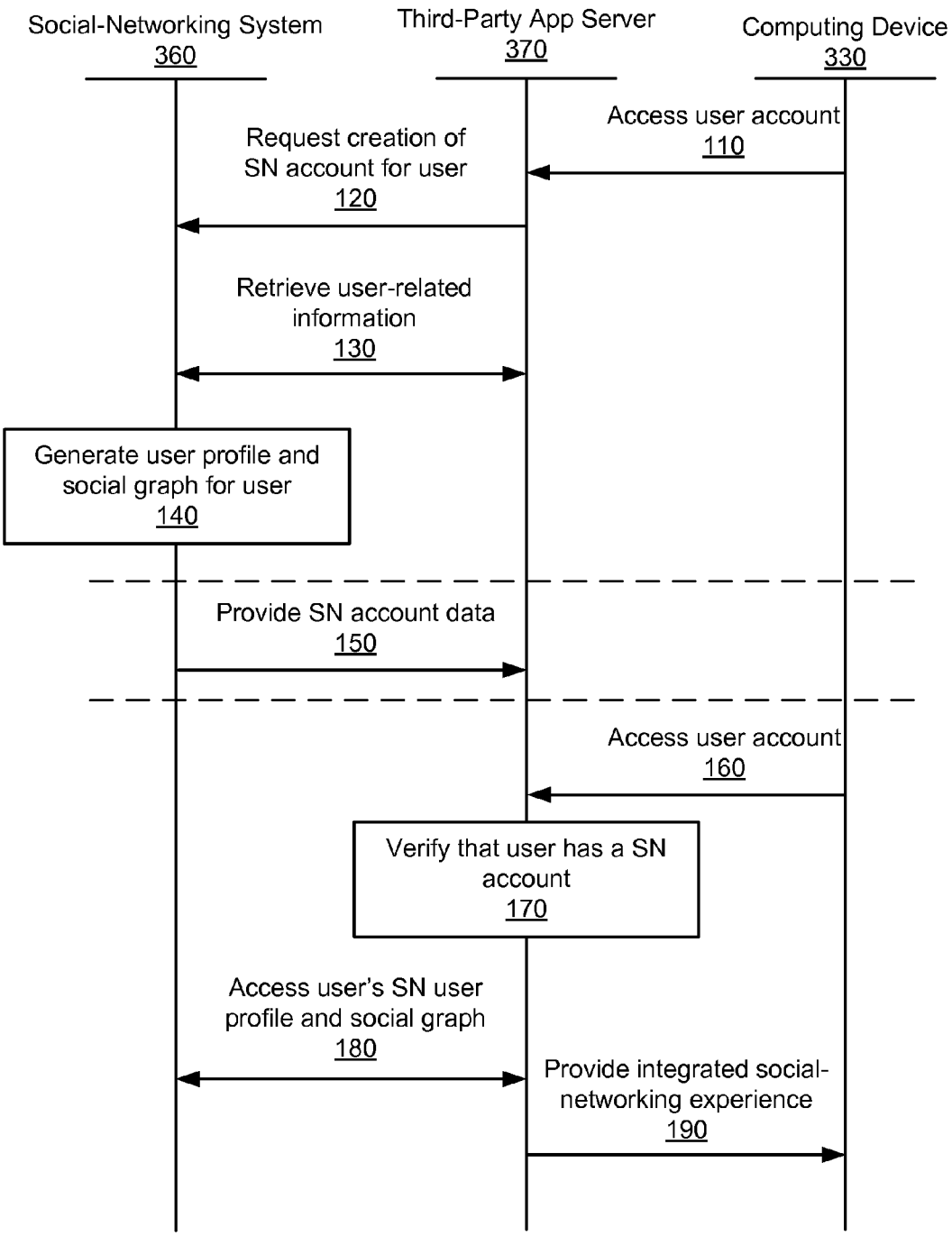
FIG. 1 illustrates an interaction diagram for providing social-networking integration for an information exchange system.

FIG. 1 illustrates an interaction diagram for providing social-networking integration for an information exchange system. A computing device 330 associated with a user may send a request to a third-party application server 370 to access 110 their user account information on an information exchange system. As discussed above, the information exchange system may be any type of system that includes a network of users who may correspond with or otherwise interact with each other. If a determination is made that the information exchange system would like to provide the user with an integrated social-networking experience, the third-party app server 370 may transmit to a social-networking system 360 a request 120 for creation of a social-networking account for the user. This request may include a unique identifier (such as, for example, an email address or cellphone number). In particular embodiments, the social-networking system 360 may then verify whether a social-networking account already exists for the user (and return information about the user's existing social-networking account if appropriate).

The social-networking system 360 may then retrieve 130 user-related information for the user from the third-party app server 370. In order to retrieve this information, the social-networking system 360 may utilize the unique identifier provided in the request 120. The user-related information may include any appropriate user-related information for which permissions have been granted, such as, by way of example and not limitation: the user's name, contact information, preferences, interests, affiliations, other profile information, image(s), transaction history, or location history.

The user-related information may also include information associated with the user's contacts in the context of the information exchange system, such as, by way of example and not limitation, the user's contact list, or a log of communications or other interactions with the other users. Such information may include uniquely-identifying information for each of the user's contacts, such as an email address, username, cellphone number, IP address, or other user-identifying information, such as a combination of information (e.g., first name, last name, and mailing address).

The social-networking system 360 may then generate 140 a user profile and social graph information for the user. Generating the social graph information may include looking up each of the users in the user's contact list or log of communications or other interactions with other users of the information exchange system, determining whether a user node exists in the social graph for each of those users, and creating an edge between any discovered pre-existing user nodes and the user's newly-created node in the social graph. Generating the social graph information may also include determining whether any of the user-related information corresponds to an existing element in the social graph, and adding information as appropriate to the user's newly-created node, to the existing element in the social graph, or between the user's newly-created node and the existing element.

In particular embodiments, the social-networking system 360 may provide 150 the information exchange system with social-networking account data associated with users of the social-networking system. The social-networking system may periodically push batch uploads of information out to a third-party app server 370 at the information exchange system, or it may provide an application protocol interface (API) for the information exchange system to pull such information from the social-networking system 360. The information exchange system may store the information associated with users of the social-networking system in an indexed data store in order to provide fast lookup of users based on unique identifiers (e.g., email address or user ID). In particular embodiments, in order to provide secure transfer of user information, the social-networking system may provide user information that has been encrypted using a secure hash based on a private key; when the information exchange system needs to look up information for a particular user, the information exchange system may encrypt the user identifier using the secure hash based on a corresponding public key, so as to see if a matching entry exists in the list of users of the social-networking system. Although the example provided describes encryption based on a secure hash using a public-private key method, any type of suitable encryption may be used with the embodiments described herein.

Once the user of the information exchange system has an account with the social-networking system, the information exchange system may then retrieve or access social graph or other social-networking information of the user, so as to provide such information for display to the user in connection with an interface provided by the information exchange system. When the user's computing device 330 accesses 160 the user's account information by contacting the third-party app server 370 via a user interface provided by the information exchange system, the information exchange system may verify 170 whether the user has a social-networking account. Such verification may be rapidly accomplished by accessing the social-networking account data previously acquired in transaction 150 described above.

Once the third-party app server 370 has verified that the user has a social-networking account, the information exchange system may access 180 the user's social-networking user profile and social graph information in order to provide 190 an integrated social-networking experience within the native user interface provided by the information exchange system. In particular embodiments, the social-networking system may provide the information exchange system with access to such information by providing an API that is accessed by client-side code (e.g., JavaScript) or functionality to create a connection to the social-networking system in order to retrieve social graph or other social-networking information of the user from the user's computing device. In such cases, the information exchange system may check the user's computing device to determine whether the user is connected (e.g., logged in) to the social-networking system, if necessary to provide such client-side functionality.

Figure 2:
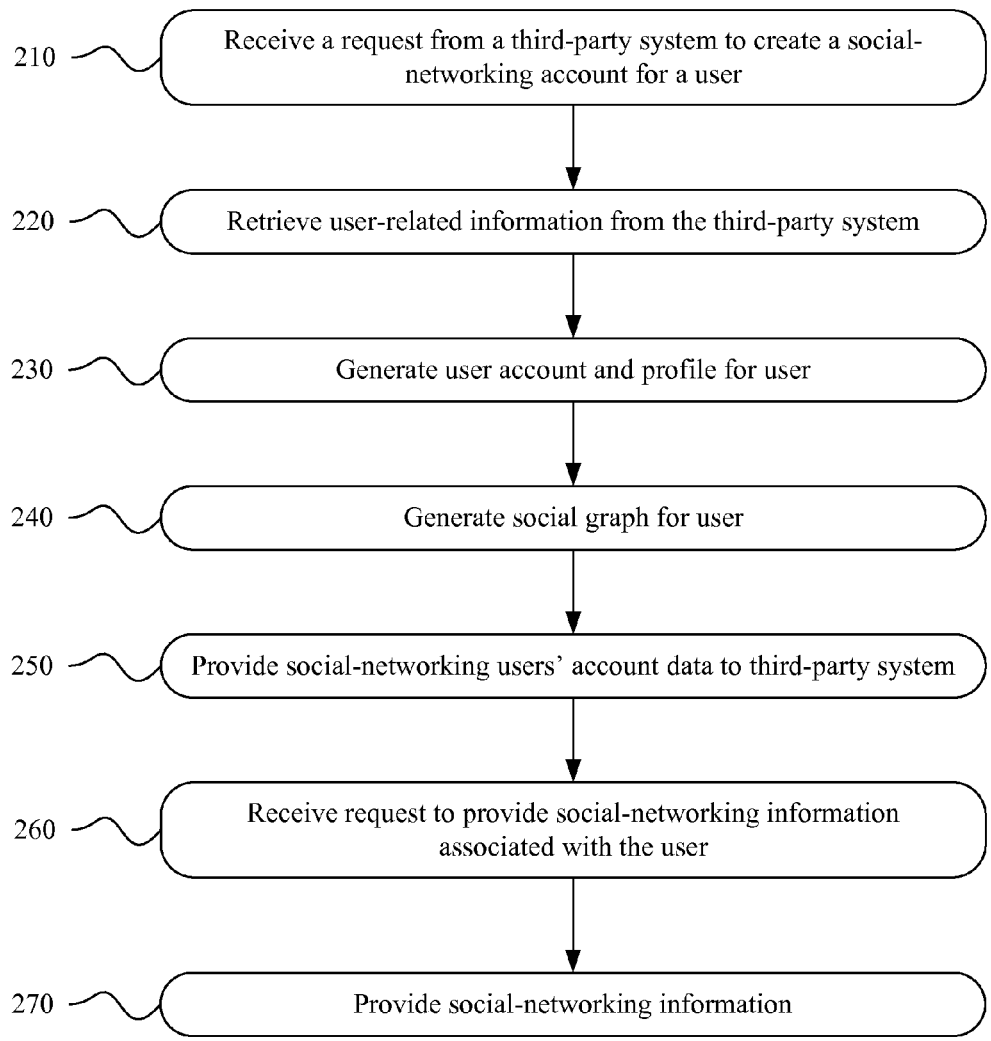
FIG. 2 illustrates an example workflow for providing social-networking integration for an information exchange system.

FIG. 2 illustrates an example method 200 for providing social-networking integration with an information exchange system. In step 210, the social-networking system may receive a request from the information exchange system to create a social-networking account for a user. As previously described, this request may include a unique identifier, such as, by way of example and not limitation, an email address or username.

In step 220, the social-networking system may retrieve user-related information from the information exchange system. In particular embodiments, the social-networking system may retrieve such user-related information in accordance with privacy and/or security settings configured on the information exchange system.

In step 230, the social-networking system may generate a user account and a user profile for the user. If information for contacts of the user were retrieved from the information exchange system, the social-networking system may also generate (240) a social graph for the user. For example, if it can be determined that one of the user's contacts already has a social-networking account, an edge may be created between the user's node and the contact's user node in the social graph In step 250, the social-networking system provides account data for social-networking users to the information exchange system. In particular embodiments, the social-networking system may only provide account data for users of the social-networking system who have enabled privacy and content access permissions accordingly to enable such access by a third-party system.

In step 260, the social-networking system may receive a request to provide social-networking information associated with the user. Such a request may originate with the information exchange system (if integration of the social-networking information is handled on the server-side), or with the user's computing device (if integration of the social-networking information is handled by way of a client-side API call or other client-side functionality). In step 270, the social-networking system may provide social-networking information associated with the user.

Figure 3:
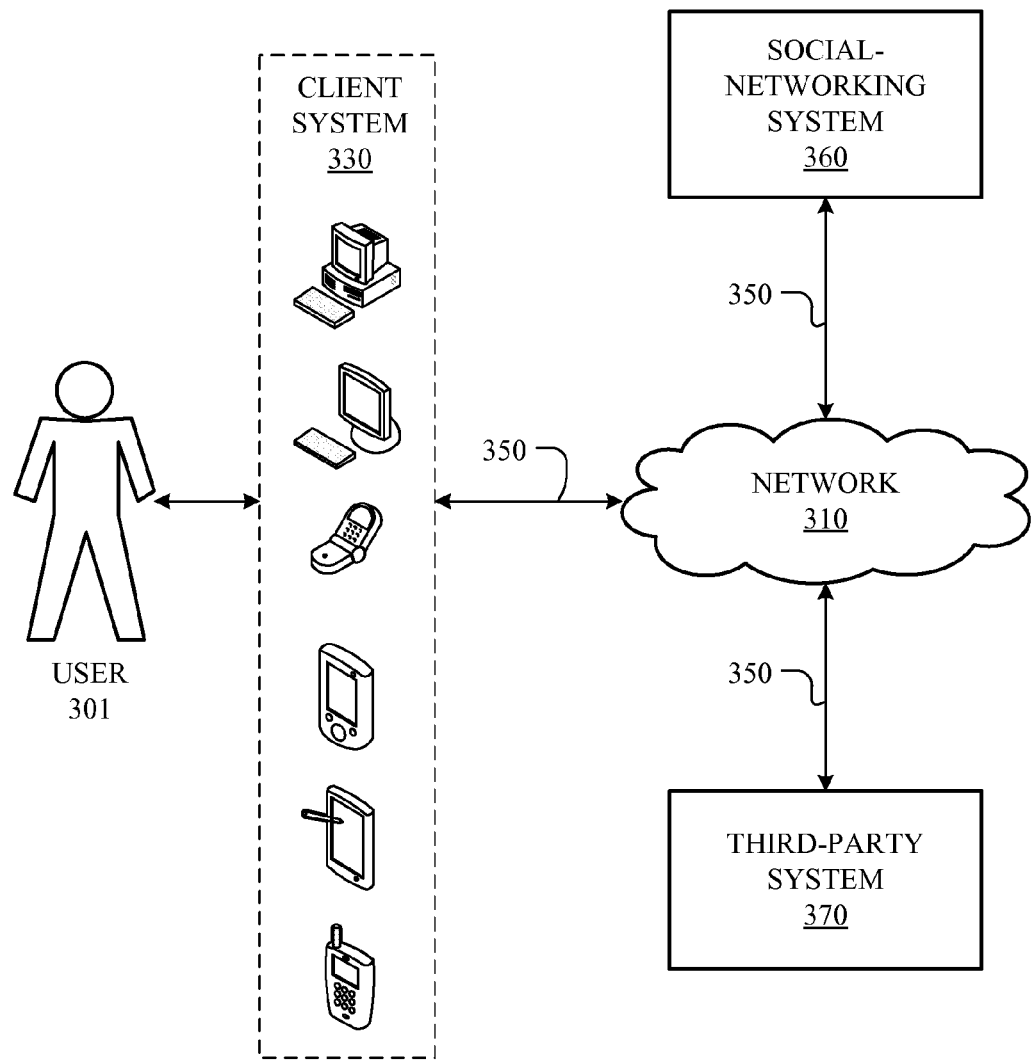
FIG. 3 illustrates an example network environment associated with a social-networking system.

FIG. 3 illustrates an example network environment 300 associated with a social-networking system. Network environment 300 includes a client system 330, a social-networking system 360, and a third-party system 370 connected to each other by a network 310. Although FIG. 3 illustrates a particular arrangement of client system 330, social-networking system 360, third-party system 370, and network 310, this disclosure contemplates any suitable arrangement of client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of client systems 330, social-networking systems 360, third-party systems 370, and networks 310, this disclosure contemplates any suitable number of client systems 330, social-networking systems 360, third-party systems 370, and networks 310. As an example and not by way of limitation, network environment 300 may include multiple client system 330, social-networking systems 360, third-party systems 370, and networks 310.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

In particular embodiments, client system 330 may be an electronic device including hardware, software, or embedded logic components or a combination of two or more such components and capable of carrying out the appropriate functionalities implemented or supported by client system 330. As an example and not by way of limitation, a client system 330 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 330. A client system 330 may enable a network user at client system 330 to access network 310. A client system 330 may enable its user to communicate with other users at other client systems 330.

In particular embodiments, client system 330 may include a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 330 may enter a Uniform Resource Locator (URL) or other address directing the web browser 332 to a particular server (such as server 362, or a server associated with a third-party system 370), and the web browser 332 may generate a Hyper Text Transfer Protocol (HTTP) request and communicate the HTTP request to server. The server may accept the HTTP request and communicate to client system 330 one or more Hyper Text Markup Language (HTML) files responsive to the HTTP request. Client system 330 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 360 may be a network-addressable computing system that can host an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. In particular embodiments, social-networking system 360 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, social-networking system 364 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 330, a social-networking system 360, or a third-party system 370 to manage, retrieve, modify, add, or delete, the information stored in data store 364.

In particular embodiments, social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. Social-networking system 360 may provide users of the online social network the ability to communicate and interact with other users. In particular embodiments, users may join the online social network via social-networking system 360 and then add connections (e.g., relationships) to a number of other users of social-networking system 360 whom they want to be connected to. Herein, the term "friend" may refer to any other user of social-networking system 360 with whom a user has formed a connection, association, or relationship via social-networking system 360.

In particular embodiments, social-networking system 360 may provide users with the ability to take actions on various types of items or objects, supported by social-networking system 360. As an example and not by way of limitation, the items and objects may include groups or social networks to which users of social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 360 or by an external system of third-party system 370, which is separate from social-networking system 360 and coupled to social-networking system 360 via a network 310.

In particular embodiments, social-networking system 360 may be capable of linking a variety of entities. As an example and not by way of limitation, social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating social-networking system 360. In particular embodiments, however, social-networking system 360 and third-party systems 370 may operate in conjunction with each other to provide social-networking services to users of social-networking system 360 or third-party systems 370. In this sense, social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 360 also includes user-generated content objects, which may enhance a user's interactions with social-networking system 360. User-generated content may include anything a user can add, upload, send, or "post" to social-networking system 360. As an example and not by way of limitation, a user communicates posts to social-networking system 360 from a client system 330. Posts may include data such as status updates or other textual data, location information, photos, videos, links, music or other similar data or media. Content may also be added to social-networking system 360 by a third-party through a "communication channel," such as a newsfeed or stream.

In particular embodiments, social-networking system 360 may include a variety of servers, sub-systems, programs, modules, logs, and data stores. In particular embodiments, social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 360 may also include suitable components such as network interfaces, security mechanisms, load balancers, failover servers, management-and-network-operations consoles, other suitable components, or any suitable combination thereof. In particular embodiments, social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 360 to one or more client systems 330 or one or more third-party system 370 via network 310. The web server may include a mail server or other messaging functionality for receiving and routing messages between social-networking system 360 and one or more client systems 330. An API-request server may allow a third-party system 370 to access information from social-networking system 360 by calling one or more APIs. An action logger may be used to receive communications from a web server about a user's actions on or off social-networking system 360. In conjunction with the action log, a third-party-content-object log may be maintained of user exposures to third-party-content objects. A notification controller may provide information regarding content objects to a client system 330. Information may be pushed to a client system 330 as notifications, or information may be pulled from client system 330 responsive to a request received from client system 330. Authorization servers may be used to enforce one or more privacy settings of the users of social-networking system 360. A privacy setting of a user determines how particular information associated with a user can be shared. The authorization server may allow users to opt in or opt out of having their actions logged by social-networking system 360 or shared with other systems (e.g., third-party system 370), such as, for example, by setting appropriate privacy settings. Third-party-content-object stores may be used to store content objects received from third parties, such as a third-party system 370. Location stores may be used for storing location information received from client systems 330 associated with users. Advertisement-pricing modules may combine social information, the current time, location information, or other suitable information to provide relevant advertisements, in the form of notifications, to a user.

Figure 4:
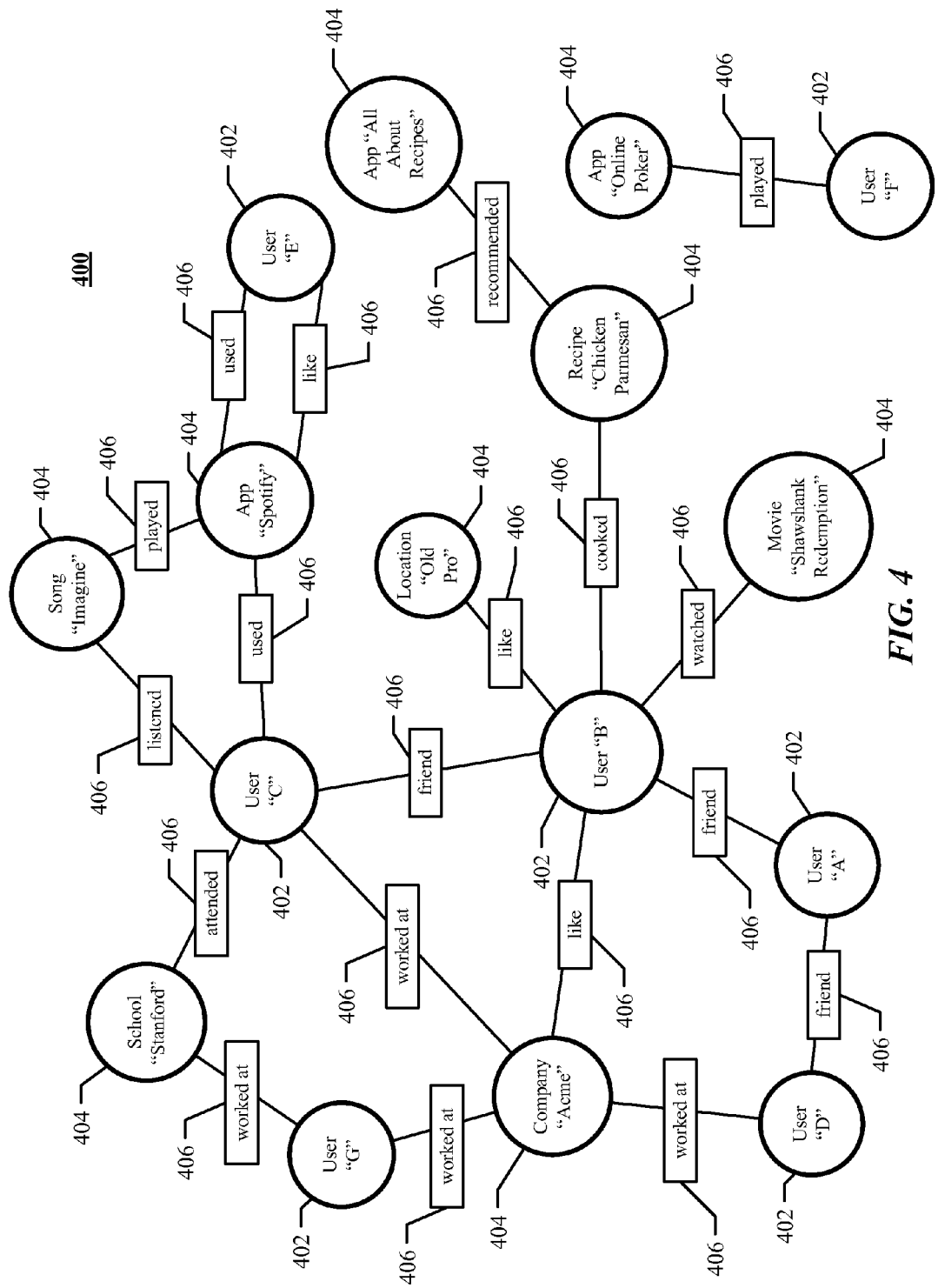
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party server 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 330 to send to social-networking system 360 a message indicating the user's action. In response to the message, social-networking system 360 may create an edge (e.g., an "eat" edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 24. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship, follower relationship, visitor relationship, subscriber relationship, superior/ subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to a edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Figure 5:
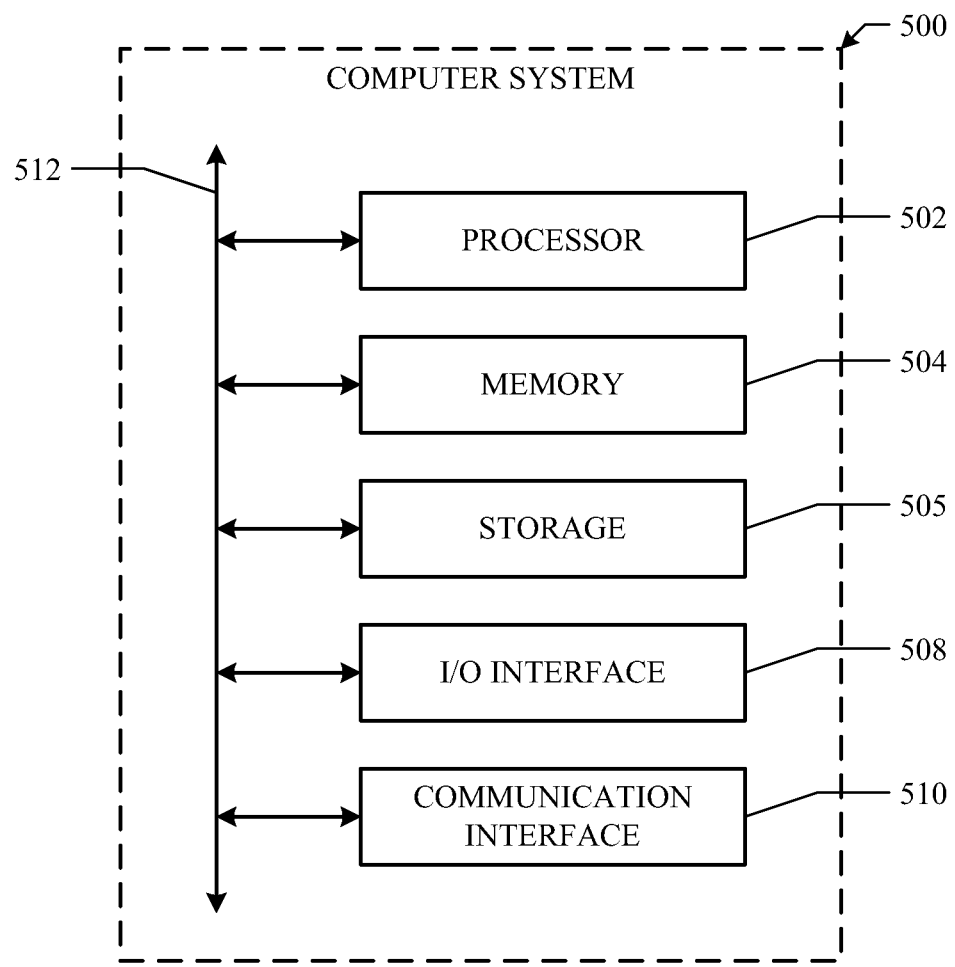
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by one or more computer servers associated with a social-networking system, receiving a request from a third-party system to create a social-networking account for a user, the request comprising a unique identifier of the user or a client device associated with the user, the request having been generated in response to a request from the user to access third-party account information from the third-party system;
    by the one or more computer servers, retrieving user-related information from the third-party system;
    by the one or more computer servers, generating the social-networking account for the user, the social-networking account comprising a user profile and a user node in a social graph stored by the social-networking system, the social graph comprising a plurality of nodes and a plurality of edges connecting the nodes, each edge representing at least one relationship between a pair of nodes; and
    by the one or more computer servers, providing social-networking account data to the third-party system.

2. The method of claim 1, wherein the providing social-networking account data to the third-party system comprises:
    providing an API to access the social-networking account data.

3. The method of claim 2, wherein the providing social-networking account data to the third-party system comprises:
    pushing the social-networking account data to the third-party system, the social-networking account data uniquely identifying each of a set of users of the social-networking system.

4. The method of claim 3, wherein:
    the social-networking account data comprises a secure hash of information uniquely identifying a user from the set of users, the secure hash being based on a public key.

5. The method of claim 1, wherein the user-related information comprises one or more of: the user's name, contact information, preferences, interests, affiliations, other profile information, image(s), transaction history, or location history.

6. The method of claim 1, wherein the user-related information comprises information for contacts of the user.

7. The method of claim 6, wherein the information for each of the user's contacts comprises one or more of: an email address, username, cellphone number, IP address, or other user-identifying information.

8. The method of claim 6, wherein generating the social-networking account comprises:
    generating a node for the user in the social graph; and
    creating a social-networking profile for the user.

9. The method of claim 8, wherein generating the social-networking account comprises, for at least one of the user's contacts:
    determining that a user node exists in the social graph for the contact; and
    creating an edge between the user node for the contact and the user's node in the social graph.

10. One or more computer-readable non-transitory storage media embodying software that is operable when executed to:
    by one or more computer servers associated with a social-networking system, receive a request from a third-party system to create a social-networking account for a user, the request comprising a unique identifier of the user or a client device associated with the user, the request having been generated in response to a request from the user to access third-party account information from the third-party system;

by the one or more computer servers, retrieve user-related information from the third-party system;

by the one or more computer servers, generate the social-networking account for the user, the social-networking account comprising a user profile and a user node in a social graph stored by the social-networking system, the social graph comprising a plurality of nodes and a plurality of edges connecting the nodes, each edge representing at least one relationship between a pair of nodes; and by the one or more computer servers, provide social-networking account data to the third-party system.

11. The media of claim 10, wherein the user-related information comprises information for contacts of the user.

12. The media of claim 11, wherein the information for each of the user's contacts comprises one or more of: an email address, username, cellphone number, IP address, or other user-identifying information.

13. The media of claim 11, wherein the software operable to generate the social-networking account comprises software operable to:
generate a node for the user in the social graph; and
create a social-networking profile for the user.

14. The media of claim 13, wherein the software operable to generate the social-networking account comprises, for at least one of the user's contacts, software operable to:
determine that a user node exists in the social graph for the contact; and
create an edge between the user node for the contact and the user's node in the social graph.

15. A system comprising:
one or more processors of one or more computer servers associated with a social-networking system; and
a memory coupled to the processors comprising instructions executable by the processors, the processors being operable when executing the instructions to:
receive a request from a third-party system to create a social-networking account for a user, the request comprising a unique identifier of the user or a client device associated with the user, the request having been generated in response to a request from the user to access third-party account information from the third-party system;
retrieve user-related information from the third-party system;
generate the social-networking account for the user, the social-networking account comprising a user profile and a user node in a social graph stored by the social-networking system, the social graph comprising a plurality of nodes and a plurality of edges connecting the nodes, each edge representing at least one relationship between a pair of nodes; and
provide social-networking account data to the third-party system.

16. The system of claim 15, wherein the processors are further operable when executing the instructions to provide social-networking account data to the third-party system to:
provide an API to access the social-networking account data.

17. The system of claim 16, wherein the processors are further operable when executing the instructions to provide social-networking account data to the third-party system to:
push the social-networking account data to the third-party system, the social-networking account data uniquely identifying each of a set of users of the social-networking system.

18. The system of claim 17, wherein the social-networking account data comprises:
a secure hash of information uniquely identifying a user from the set of users, the secure hash being based on a public key.

19. The system of claim 15, wherein the processors are further operable when executing the instructions to generate the social-networking account to:
generate a node for the user in the social graph; and
create a social-networking profile for the user.

20. The system of claim 19, wherein the user-related information comprises information for contacts of the user, and wherein the processors are further operable when executing the instructions to generate the social-networking account to, for at least one of the user's contacts:
determine that a user node exists in the social graph for the contact; and
create an edge between the user node for the contact and the user's node in the social graph.

21. The media of claim 10, wherein the software that is operable when executed to provide social-networking account data to the third-party system comprises software that is operable when executed to provide an API to access the social-networking account data.

22. The media of claim 21, wherein the software that is operable when executed to provide social-networking account data to the third-party system comprises software that is further operable when executed to push the social-networking account data to the third-party system, the social-networking account data uniquely identifying each of a set of users of the social-networking system.

23. The media of claim 22, wherein the social-networking account data comprises a secure hash of information uniquely identifying a user from the set of users, the secure hash being based on a public key.

24. The media of claim 10, wherein the user-related information comprises one or more of: the user's name, contact information, preferences, interests, affiliations, other profile information, image(s), transaction history, or location history.

25. The system of claim 15, wherein the user-related information comprises one or more of: the user's name, contact information, preferences, interests, affiliations, other profile information, image(s), transaction history, or location history.

26. The system of claim 15, wherein the user-related information comprises information for contacts of the user.

27. The system of claim 26, wherein the information for each of the user's contacts comprises one or more of: an email address, username, cellphone number, IP address, or other user-identifying information.

* * * * *